US009481012B2

(12) United States Patent
Anderson et al.

(10) Patent No.: US 9,481,012 B2
(45) Date of Patent: Nov. 1, 2016

(54) METHOD OF FILLING VOIDS AROUND COUNTERSUNK FASTENER HEADS

(75) Inventors: Weston K. Anderson, Federal Way, WA (US); Paul J. Ambrose, Orting, WA (US); Eric R. Steele, Kent, WA (US)

(73) Assignee: The Boeing Company, Chicago, IL (US)

( * ) Notice: Subject to any disclaimer, the term of this patent is extended or adjusted under 35 U.S.C. 154(b) by 1198 days.

(21) Appl. No.: 13/479,262

(22) Filed: May 23, 2012

(65) Prior Publication Data

US 2013/0316120 A1     Nov. 28, 2013

(51) Int. Cl.
| | |
|---|---|
| *B05D 7/22* | (2006.01) |
| *B05D 1/28* | (2006.01) |
| *B64C 1/12* | (2006.01) |
| *B64F 5/00* | (2006.01) |
| *F16B 5/00* | (2006.01) |
| *F16B 19/04* | (2006.01) |
| *B64C 1/00* | (2006.01) |

(52) U.S. Cl.
CPC . *B05D 7/22* (2013.01); *B05D 1/28* (2013.01); *B64C 1/12* (2013.01); *B64F 5/0009* (2013.01); *B64C 2001/0072* (2013.01); *F16B 5/00* (2013.01); *F16B 19/04* (2013.01); *Y02T 50/433* (2013.01); *Y10T 428/20* (2015.01)

(58) Field of Classification Search
None
See application file for complete search history.

(56) References Cited

U.S. PATENT DOCUMENTS

| | | | | |
|---|---|---|---|---|
| 1,944,150 | A * | 1/1934 | Brugge | F16B 15/02 411/439 |
| 3,642,312 | A * | 2/1972 | Dalton | F16B 19/04 403/408.1 |
| 3,906,308 | A * | 9/1975 | Amason | B64D 45/02 244/1 A |

(Continued)

FOREIGN PATENT DOCUMENTS

EP     0 432 164 B1 *   6/1991

OTHER PUBLICATIONS

Deft, Product Information Data Sheet for BAC 5322/BAC 5681/ BAC 5837 Polyurethane Sanding Surfacer, Jul. 2006, 1 page.*

(Continued)

*Primary Examiner* — William Phillip Fletcher, III
(74) *Attorney, Agent, or Firm* — Miller, Matthias & Hull LLP

(57) ABSTRACT

A method for a structure having a countersunk fastener head includes forcing an aliphatic urethane surfacer into a void around the fastener head.

14 Claims, 4 Drawing Sheets

(56) References Cited

U.S. PATENT DOCUMENTS

| | | | | |
|---|---|---|---|---|
| 4,479,163 | A | * | 10/1984 | Bannink, Jr. .......... B64D 45/02 244/1 A |
| 4,502,092 | A | * | 2/1985 | Bannink, Jr. .......... B64D 45/02 244/1 A |
| 4,628,402 | A | * | 12/1986 | Covey .................... B64D 45/02 361/218 |
| 4,760,493 | A | * | 7/1988 | Pearson ................. B64D 45/02 244/1 A |
| 4,891,732 | A | * | 1/1990 | Jones .................... F16B 37/044 174/2 |
| 4,905,931 | A | * | 3/1990 | Covey .................... F16B 33/004 244/1 A |
| 7,050,286 | B2 | * | 5/2006 | Pridham ................ B64D 45/02 244/1 A |
| 7,277,266 | B1 | * | 10/2007 | Le .......................... B64D 45/02 361/218 |
| 7,307,825 | B2 | * | 12/2007 | De La Fuente De Ana ...................... B29C 70/885 361/212 |
| 7,554,785 | B2 | * | 6/2009 | Hawley ................. B64D 45/02 361/112 |
| 7,599,164 | B2 | * | 10/2009 | Heeter ................... B64D 37/32 361/117 |
| 8,231,751 | B2 | * | 7/2012 | Ackerman ............. B29C 73/10 156/298 |
| 8,246,770 | B2 | * | 8/2012 | Ackerman ............. B32B 38/10 156/298 |
| 8,784,589 | B2 | * | 7/2014 | Ackerman ............. B32B 38/10 156/298 |
| 9,034,454 | B1 | * | 5/2015 | Bowman ............... B32B 25/047 405/116 |
| 2002/0119028 | A1 | * | 8/2002 | Brown .................... B64C 1/12 411/372.5 |
| 2007/0041143 | A1 | * | 2/2007 | Georgeson ............. B64D 45/02 361/220 |
| 2010/0219287 | A1 | * | 9/2010 | Sanchez-Brunete Alvarez ................. B64D 45/02 244/1 A |
| 2010/0277849 | A1 | * | 11/2010 | Morrill .................. B64D 45/02 361/218 |
| 2014/0283987 | A1 | * | 9/2014 | Contractor ............. B29C 70/74 156/272.8 |
| 2015/0167142 | A1 | * | 6/2015 | Poupon .................. B32B 37/00 428/650 |

OTHER PUBLICATIONS

"Investigate Alternate Sealant Materials for Countersunk Fasteners Head and Hole Cavities on Exterior of Submarines," Navy SBIR 2011.3—Topic N113-178, 2011, 2 pages.*

Mulazimoglu et al., "Recent Developments in Techniques to Minimize Lightning Current Arcing Between Fasteners and Composite Structure," Alcoa, 2011, 16 pages.*

Epoxy.com Product #461, "Heavy Duty Duel Component Chemical and Abrasion Resistant Aliphatic Urethane" www.epoxysystems.com/461.aspx (downloaded Apr. 2012).

Boeing Environmental Technotes, "Rivet Rash—The Itch that Won't Heal" vol. 8, No. 3, Aug. 2003.

Deft, Product Information Data Sheet for BAC 5322/BAC 5681/BAC 5837 Polyurethane Sanding Surfacer (Jul. 2006).

* cited by examiner

METHOD OF FILLING VOIDS AROUND COUNTERSUNK FASTENER HEADS

BACKGROUND

A paint system is applied to a commercial aircraft prior to customer delivery. The paint system may include a decorative coating, which enhances the aircraft's appearance, provides operator markings, etc. The paint system may also include a protective coating in certain areas to prevent corrosion. On composite aircraft, the protective coating also prevents ultra violet radiation, erosion, and moisture ingress.

The paint system may include a primer, which is applied to an exterior surface of the fuselage. In addition to covering composite skin, the primer covers fasteners. One or more coats of paint is applied over the primer.

"Halos" sometimes appear around countersunk fasteners. The halos appear as visible circular or semi-circular depressions in the paint around the fasteners. These halos are undesirable, as they detract from the aircraft's appearance.

SUMMARY

According to an embodiment herein, a method for a structure having a countersunk fastener head includes forcing an aliphatic urethane surfacer into a void around the fastener head.

According to another embodiment herein, a method for an aircraft fuselage having composite skin comprises forcing an aliphatic urethane surfacer into voids in skin around countersunk fastener heads to completely fill the voids; and applying a paint system to the fuselage.

According to another embodiment herein, an aircraft comprises composite skin, a plurality of fasteners having heads countersunk in an exterior surface of the skin, and aliphatic urethane surfacer completely filling voids in the skin around the countersunk fastener heads.

These features and functions may be achieved independently in various embodiments or may be combined in other embodiments. Further details of the embodiments can be seen with reference to the following description and drawings.

DETAILED DESCRIPTION

Figure 1A:
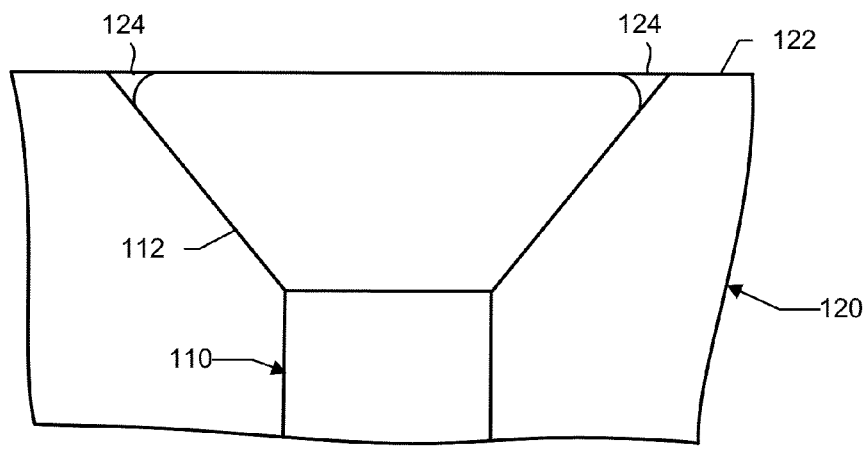
FIGS. 1A and 1B are illustrations of a fastener that is countersunk in a composite structure.
Figure 1B:
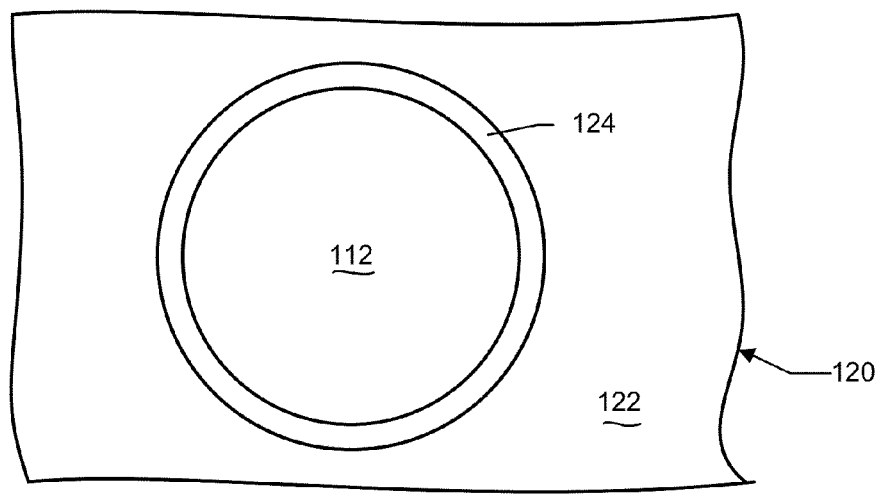

Reference is made to FIGS. 1A and 1B, which illustrate a fastener 110 that is countersunk into a structure 120 made of composite material. The fastener's head 112 may be flush with a surface 122 of the structure 120, or it may be a few mils above or below the surface 122.

To countersink the fastener head 112, a counterbore may be machined into the surface 122. Consequently, the fastener head 112 is surrounded by a cut edge.

A void 124 exists between the cut edge and the fastener head 112. The void is formed because the fastener 110 is shaped in such a way that it leaves space between the fastener head 112 and the cut edge of the composite structure 120. The void 124 may be circular and continuous (as shown in FIG. 1B), and it may have a somewhat triangular shape in cross-section (as shown in FIG. 1A). Typical depth and width of the void 124 may be five mils by eight mils for a mid size 5/16" fastener.

If an aliphatic urethane surfacer is applied to the surface 122 in a conventional manner (spraying), a halo might subsequently form around the fastener head 112. The applicants have discovered that the halo might form because the conventionally-applied surfacer does not fill the void 124.

The applicants have also discovered that the halo can be eliminated by sufficiently forcing an aliphatic urethane surfacer into the void 124 around the fastener head 112. For instance, the surfacer may be mechanically forced into the void 124 using a sponge, roller or brush.

In some embodiments, excess surfacer is applied to ensure that the void 124 is completely filled. Any surfacer outside of the void 124 is removed. It is preferable to completely fill the void 124 to mitigate the potential for visible paint depressions around the fastener 110. Filling the void 124 at the surface 122 may prevent air pockets, which may ultimately cause paint cracking around the fastener head 112 in service.

A surfacer denotes a particular functional category of coating material. Aliphatic urethane denotes the type of polymeric chemistry associated with the material.

The composite structure 120 is not limited to anything in particular. One example is composite skin of an aircraft fuselage.

Figure 2:
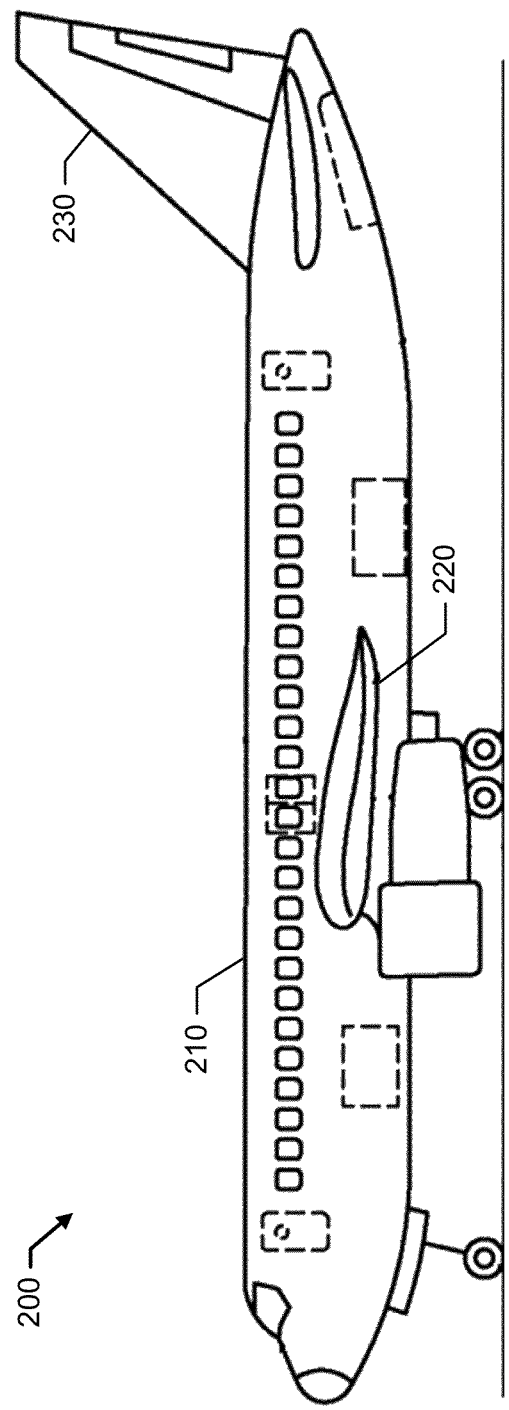
FIG. 2 is an illustration of a commercial aircraft.

FIG. 2 illustrates a commercial aircraft 200. The aircraft 200 includes a fuselage 210, wing assemblies 220, and empennage 230. Each component 210-230 includes composite skin panels that are fastened together and to a stiffening substructure. Materials for the fasteners and skin panels are compatible. For example, titanium fasteners may be used with skin panels made of carbon fiber reinforced plastic. These fasteners may have been installed by drilling holes into the skin panels, countersinking, inserting the fasteners into the drill holes, and terminating the fasteners.

Now consider the fabrication of the fuselage 210. For some aircraft, the fuselage 210 may be formed in sections, which are joined together. For instance, mid fuselage sections 43, 44 and 46 are joined together, and this mid fuselage is painted. Nose section 41 is separately painted and subsequently joined to the mid fuselage. Empennage sections 47 and 48 are also separately painted and subsequently joined to the mid fuselage. Additional painting is performed after the sections have been joined.

Figure 3:
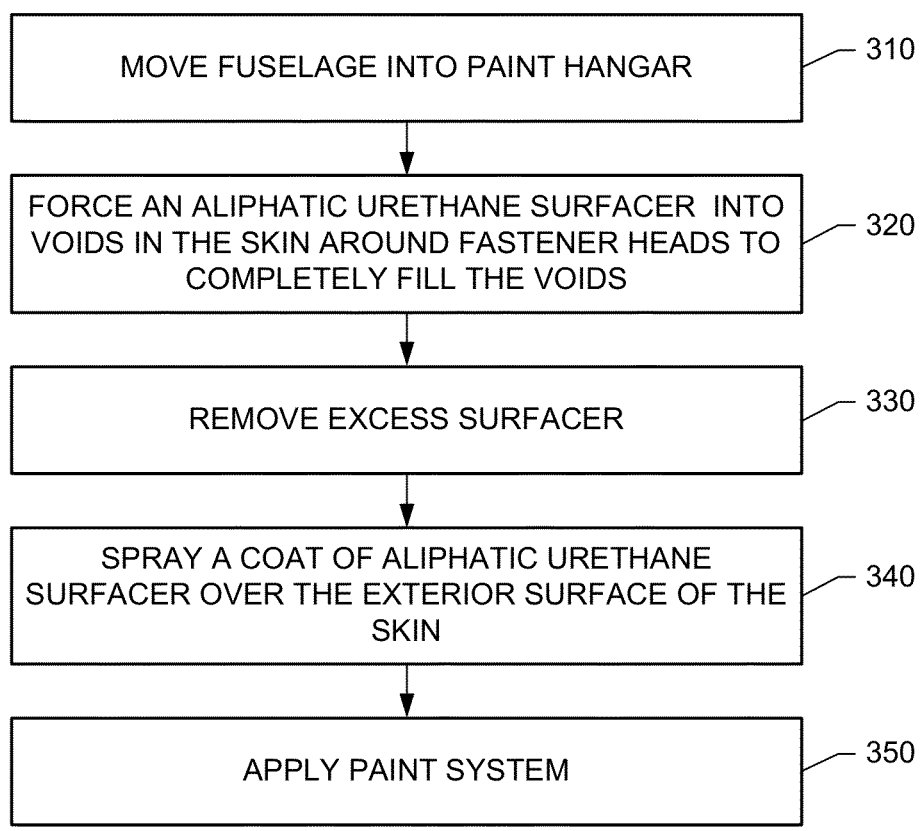
FIG. 3 is an illustration of a method including applying a paint system to an aircraft.

FIG. 3 illustrates a method that may be applied to the fasteners at the surfaces of each of these sections individually (that is, prior to being joined to another section). The method of FIG. 3 may also be applied to the fasteners at joints of joined sections.

Reference is now made to FIG. 3, which illustrates a method including applying a paint system to composite skin of a fuselage. At block 310, the fuselage (either the entire fuselage or a portion of it) is moved to a paint hangar. In some embodiments, the paint hangar may be a class 1 division 1 (C1D1) location having the area of a football field. A C1D1 location refers to a location in which ignitable concentrations of such gases or vapors may exist.

At block 320, aliphatic urethane surfacer is forced into voids in composite skin around fastener heads to completely fill the voids. Only those exterior surfaces with fasteners may be treated. The aliphatic urethane surfacer may be applied manually using, for instance, a sponge, roller, brush or other tool.

The aliphatic urethane surfacer is compatible with the type of paint system used on commercial aircraft, including a compatible strain modulus (which reduces cracking). In some embodiments, the aliphatic urethane surfacer may be a two-component, chrome free, chemically cured, high solids, polyurethane surfacer. A first component contains pigment and polyester resin, and a second component is a clear, non-pigmented aliphatic isocyanate prepolymer, which acts as a hardener or curing agent for the first component. The components are mixed prior to forcing the aliphatic urethane surfacer into the voids.

At block 330, excess surfacer is removed from the surface of the skin. The excess surfacer may be removed manually using, for example, a squeegee.

At block 340, a coat of aliphatic urethane surfacer is sprayed over the skin. The coat, which is typically no more than four mils thick, may be applied within one to six hours after the aliphatic urethane surfacer is forced into the voids. The surfacer is cured, and the fuselage is sanded.

At block 350, a paint system is applied. For instance, the paint system may include primer and one or more coats of paint.

In other embodiments, the surfacer coat (block 340) may be skipped. Instead, the surfacer filling the voids is cured, the fuselage is sanded, and the paint system is applied to the sanded fuselage.

Figure 4:
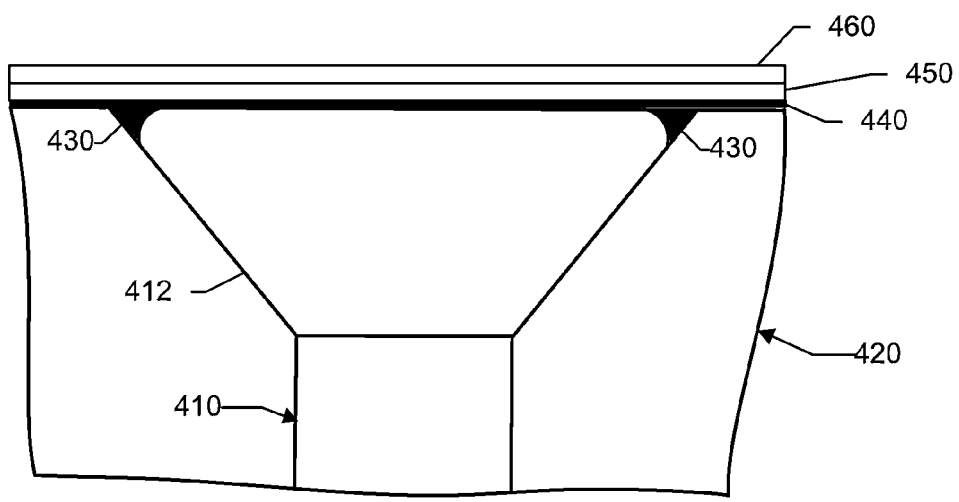
FIG. 4 is an illustration of an aircraft fastener that is countersunk in a composite skin panel and covered with a paint system.

Reference is now made to FIG. 4, which illustrates an aircraft fastener 410 having a head 412 that is countersunk into a composite skin panel 420. Aliphatic urethane surfacer 430 completely fills a void in the skin panel 420 around the fastener head 412.

A coat 440 of aliphatic urethane surfacer covers the surface of the skin panel 420, as well as the fastener head 412 and aliphatic urethane surfacer 430. A primer 450 covers the surfacer coat 440, and a topcoat 460 covers the primer 450. A halo does not appear around the fastener head 412.

A method herein is not limited to a fuselage. For a commercial aircraft, the method may also be applied to the wings and empennage. For other structures that will be painted, a method herein may be applied to composite structures having small voids around fastener heads.

The invention claimed is:

1. A method for a structure having a countersunk fastener head, the method comprising mechanically forcing an aliphatic urethane surfacer into a void around the fastener head.

2. The method of claim 1, wherein mechanically forcing includes pressing the surfacer into the void, which is between the fastener head and a cut edge of the structure.

3. The method of claim 1, wherein mechanically forcing includes using a tool to press the aliphatic urethane surfacer into the void.

4. The method of claim 1, wherein the aliphatic urethane surfacer is a two-component, chrome free, chemically cured, high solids, polyurethane surfacer.

5. The method of claim 1, further comprising applying a coat of aliphatic urethane surfacer to the structure and over the surfacer forced into the void.

6. The method of claim 5, wherein the coat is applied within one to six hours after the aliphatic urethane surfacer is forced into the void.

7. The method of claim 5, further comprising applying a paint system including a primer and at least one coat of paint.

8. The method of claim 1, wherein the structure is a composite structure.

9. The method of claim 1, wherein the structure is an aircraft fuselage structure.

10. The method of claim 9, wherein the aliphatic urethane surfacer is applied only to those areas having fasteners.

11. A method for an aircraft fuselage having composite skin and fasteners having their heads countersunk in the skin, the method comprising:
    using a tool to press an aliphatic urethane surfacer into voids between cut edges of the skin and the fastener heads to completely fill the voids with the surfacer;
    allowing the surfacer to cure;
    spraying an aliphatic urethane surfacer coat onto the skin and over the fastener heads and the cured surfacer; and
    thereafter, applying a paint system to the fuselage.

12. The method of claim 11, further comprising removing excess surfacer from the skin after the surfacer has been pressed into the voids but before the coat is applied.

13. The method of claim 12, wherein the coat is sprayed on one to six hours after the surfacer has been pressed into the voids.

14. The method of claim 12, wherein applying the paint system includes applying primer to the coat and at least one coat of paint.

* * * * *